(12) United States Patent
Roeb et al.

(10) Patent No.: US 9,492,807 B2
(45) Date of Patent: Nov. 15, 2016

(54) GAS/SOLID PHASE REACTION

(75) Inventors: Martin Roeb, Koenigswinter (DE); Christian Sattler, Bonn (DE); Peter-Michael Rietbrock, Cologne (DE); Ruth Küster, Bonn (DE); Athanasios G. Konstandopoulos, Thessaloniki (GR); Christos Agrafiotis, Thessaloniki (GR); Lamark De Oliveira, Cologne (DE); Mark Schmitz, Cologne (DE)

(73) Assignee: CHEMICAL PROCESS ENGINEERING RESEARCH INSTITUTE CENTER FOR RESEARCH AND TECHNOLOGY-HELLAS (CERTH-CPERI) (GR)

( * ) Notice: Subject to any disclaimer, the term of this patent is extended or adjusted under 35 U.S.C. 154(b) by 0 days.

(21) Appl. No.: 13/011,667

(22) Filed: Jan. 21, 2011

(65) Prior Publication Data
US 2011/0135566 A1 Jun. 9, 2011

Related U.S. Application Data

(62) Division of application No. 11/918,359, filed on Jan. 3, 2008, now abandoned.

(30) Foreign Application Priority Data

Apr. 14, 2005 (DE) .......................... 10 2005 017 216
Jul. 19, 2005 (EP) ..................................... 05106614
Mar. 31, 2006 (WO) .................. PCT/EP2006/061238

(51) Int. Cl.
*B01J 8/00* (2006.01)
*C01B 3/10* (2006.01)
(Continued)

(52) U.S. Cl.
CPC ............ *B01J 19/127* (2013.01); *B01J 19/2485* (2013.01); *C01B 3/063* (2013.01); *B01J 2219/00038* (2013.01); *Y02E 60/36* (2013.01)

(58) Field of Classification Search
None
See application file for complete search history.

(56) References Cited

U.S. PATENT DOCUMENTS 3,213,141 A * 10/1965 Freyermuth et al. ......... 564/422
4,906,176 A * 3/1990 Yamashita et al. ............... 431/7
(Continued)

OTHER PUBLICATIONS

Kodama et al (2002), "Stepwise Production of CO-Rich Syngas and Hydrogen via Solar Methane Reforming by Using a Ni(II)-Ferrite Redox System," Solar Energy vol. 73, No. 5, pp. 363-374.*
(Continued)

*Primary Examiner* — Colin W Slifka
(74) *Attorney, Agent, or Firm* — Gregory N. Clements; Clements Bernard PLLC

(57) ABSTRACT

The invention relates to a process and reactor for the quasi-continuous performance of a chemical reaction on the surface of a fixed reactant in a gas/solid phase reaction. In particular, the invention relates to a thermal process and a reactor for the continuous preparation of hydrogen from water vapor on the surface of a metal oxide in a gas/solid phase reaction.

7 Claims, 4 Drawing Sheets

(51) Int. Cl.
*B01J 19/12* (2006.01)
*B01J 19/24* (2006.01)
*C01B 3/06* (2006.01)

(56) References Cited

U.S. PATENT DOCUMENTS

2002/0038066 A1* 3/2002 Strangio ............... B01J 8/0221
 585/440
2005/0178427 A1* 8/2005 Kelly et al. ................... 136/246
2012/0009106 A1* 1/2012 Petrocelli ............. B01D 53/002
 423/235

OTHER PUBLICATIONS

Kodama et al (2004), "Thermochemical hydrogen production by a redox system of ZrO2-supported Co(II)-ferrite," Solar Energy 78, pp. 623-631.*

* cited by examiner

GAS/SOLID PHASE REACTION

1) FIELD OF THE INVENTION

The invention relates to a process and reactor for the quasi-continuous performance of a chemical reaction on the surface of a fixed reactant in a gas/solid phase reaction. In particular, the invention relates to a thermal process and a reactor for the continuous preparation of hydrogen from water vapor on the surface of a metal oxide in a gas/solid phase reaction.

2) BACKGROUND OF THE INVENTION

On a long-term basis, hydrogen is an important carrier for a sustainable energy supply. Today, most of the hydrogen is prepared from fossil sources. However, the limited presence of these sources and the indispensable reduction of greenhouse gases (mainly $CO_2$) require the exploration of alternative resources or processes. Water splitting by means of electrolysis using solar current is possible, but has the disadvantage of an enormous influence of the cost of solar current on $H_2$ production. The direct utilization of concentrated solar radiation for thermochemical water splitting avoids this and has a higher efficiency. Thus, the cost of hydrogen production can be lowered and production on an industrial scale enabled on a long-term basis.

A number of processes are available for the thermal production of hydrogen.

Thus, in DE 44 10 915 A1, hydrogen is produced by the reaction of iron with carbonic acid with supply of solar-thermal energy. The iron oxide formed is reduced again using carbon monoxide and is thus available for the process.

In DE 42 26 496 A1, hydrogen is produced in a modified continuous iron-water vapor process, and the iron oxide formed thereby is subsequently supplied to steel production again.

JP 03205302 A describes the preparation of highly pure hydrogen using activated magnetite as a reactive catalyst.

In JP 2001270701 A, hydrogen is prepared by reacting metallic zinc, magnetite and water at 600° C.

M. Inoue et al. in Solar Energy (2003) describes the preparation of hydrogen by means of a water-ZnO—$MnFe_2O_4$ system. The corresponding ferrite powder of the type $Me_x^{2+}Zn_{1-x}^{2+}Fe_2O_4$ can be prepared by the method of S. Lorentzou et al. as presented on the conference Partec 2004.

According to a press communication by the Deutsches Zentrum für Luft- and Raumfahrt of Oct. 15, 2004, hydrogen was produced for the first time in a solar oven by solar-thermal water splitting. In the process described, the hydrogen is produced discontinuously by splitting the water vapor over metal oxide and regenerating the metal oxide.

DE 197 10 986 C2 describes a volumetric radiation receptor for heat recovery from concentrated radiation by heating a fluid under pressure without a chemical reaction occurring in this reactor.

SUMMARY OF THE INVENTION

Thus, it is the object of the present invention to provide a process which can be performed, in particular, in a reaction chamber system, in which no solid need be separated and which proceeds in a quasi-continuous manner at as low temperatures as possible. It is a further object to provide a solar-operated reactor in which a product (especially hydrogen) is continuously produced although at least two process steps (for example, splitting and regeneration) necessarily proceed sequentially. In particular, it is the object of the present invention to provide a corresponding process for producing hydrogen that can be performed in at least one single reaction chamber, in particular.

In a first embodiment, this object of the invention is achieved by a process for the quasi-continuous performance of a chemical reaction comprising at least two sequential reversible steps, characterized in that:
at least two reaction chambers in each of which at least one reactant is locally fixed are operated in parallel, wherein cyclically alternating reaction conditions are provided in the reaction chambers.

Sequential steps within the meaning of the invention are successive reaction steps of a chemical reaction in which the reaction products can be isolated.

Reversible steps within the meaning of the invention are reaction steps in which the chemical equilibrium can be adjusted in such a way that alternatively either the forward or the backward reaction preferably proceeds.

A chemical reaction within the meaning of the invention is in principle any chemical reaction in which one of the reactants is fixed and in which the energy is supplied as heat energy, light energy, nuclear energy or in the form of other electromagnetic radiation. Preferably, the process according to the invention is employed in the following reaction types listed in an exemplary manner:

| Reaction type | First step | Second step |
| --- | --- | --- |
| $H_2$ production | $MeO_x + H_2O \rightarrow H_2 + MeO_y$ | $MeO_y \rightarrow MeO_x + O_2$ |
| $H_2$ production | $Me + H_2O \rightarrow H_2 + MeO$ | $MeO \rightarrow Me + \frac{1}{2} O_2$ |
| Reduction of carbon dioxide | $MeO_x + CO_2 \rightarrow MeO_y + CO$ | $MeO_y \rightarrow MeO_x + \frac{1}{2} O_2$ |
| Cleavage of nitrogen oxides | $MeO_x + NO_x \rightarrow MeO_y + \frac{1}{2} N_2$ | $MeO_y \rightarrow MeO_x + \frac{1}{2} O_2$ |
| Cleavage of $SO_3$/ production of $SO_2$ | $MeO_x + SO_3 \rightarrow MeO_y + SO_2$ | $MeO_y \rightarrow MeO_x + \frac{1}{2} O_2$ |
| Selective oxidation | $MeO_x + O_2 \rightarrow MeO_y$ | $C_mH_n + MeO_y \rightarrow MeO_x + C_mH_nO$ |
| Dehydrogenations | $MeO_x + O_2 \rightarrow MeO_y$ | $C_mH_n + MeO_y \rightarrow MeO_x + C_mH_{n-2} + H_2O$ |
| $H_2$ production | $MeX_y + HX \rightarrow MeX_{y+1} + \frac{1}{2} H_2$ | $MeX_{y+1} \rightarrow MeX_y + \frac{1}{2} X_2$ |

In this Table, Me represents a metal atom, X represents a halogen or pseudohalogen, subscripts n, m, x or y represent positive integers.

BRIEF DESCRIPTION OF THE DRAWINGS

In the following, an Example of the invention, which is the Konti reactor, is further illustrated by means of Figures. This Example is not to be understood as limiting the scope of protection of the invention.

The process according to the invention for solar-thermochemical water splitting on the basis of metal oxides for continuous hydrogen production can be performed continuously by means of the design of an appropriate receiver reactor as described herein.

In the Figures:

FIG. 1 shows a schematic representation of the time course of different reactions in different reaction chambers in the quasi-continuous process according to the invention.

FIG. 2 shows a perspective schematic representation (vertical-horizontal section) of the Konti reactor according to the invention.

FIG. 3 shows a horizontal section through the reactor.

FIG. 4 shows a representation of the heat-resistant four-way valve in the reactor.

DESCRIPTION OF THE INVENTION

In the process according to the invention, throughout the reaction time of a first sequential step of a chemical reaction in a first reaction chamber, a second sequential reaction step other than said first sequential reaction step proceeds at least one time in a second reaction chamber, which is different from the first. Thereby, it is achieved that the final product can be provided by the process at any time and the reaction chambers are utilized optimally.

Figure 1:
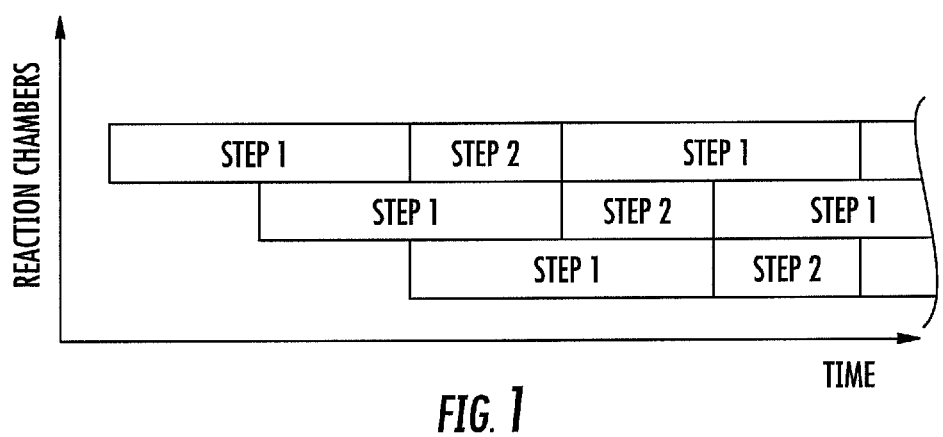

Since the different sequential reaction steps can have a different reaction time, for optimally utilizing the capacity of the reaction chambers, advantageously:
a) the energy input in the reaction chambers can be selected differently to adjust the reaction rates;
b) the mass flow of the reactants can be adjusted; and/or
c) the number of reaction chambers can be adjusted in accordance with the reaction times in which the reactions proceed in a corresponding time-shifted mode, meaning the reactions in each reaction chamber are out of phase with one another as shown in FIG. 1.

The latter variant is further illustrated by means of FIG. 1. In an exemplary manner, it is shown in FIG. 1 how a quasi-continuous process according to the invention can be operated with three reaction chambers for two reaction steps in which the second reaction step takes twice as much time as the first reaction step.

In the process according to the invention, all reversible reaction steps of the chemical reaction are preferably performed sequentially in the same reaction chambers. Thus, separation or isolation of intermediate products can be dispensed with.

Advantageously, in the process according to the invention, radiation-heated reactors are employed as reaction chambers. Thus, thermal reactions can be performed with light energy. Any electromagnetic radiation can be employed as the radiation. According to the invention, photoreactions may also advantageously take place when the process is performed. Reactions that are thermal in principle may also proceed in a photoassisted manner, in particular, according to the invention. "Photoassisted" within the meaning of the invention means that the reaction product is formed with enhancement by a photoreaction.

Said cyclically alternating reaction conditions are preferably provided by cycling the temperature of the reaction chambers, for example, by varying the heating power.

More preferably, the required temperature in the reaction chambers is varied by periodically changing the heating power to enable a quasi-continuous product stream. For example, the different thermal addressing of the reactors enables simultaneous reactions of water splitting at a lower temperature and regeneration at a higher temperature. Thus, the sequence of these different batch processes enables a quasi-continuous production of hydrogen, for example.

Advantageously, the process is performed in several successive cycles is a quasi-continuous reproducible way. For example, one cycle takes a period of time within a range of from 0.3 to 1.5 hours, especially from 0.3 to 1 hour. Over a discontinuous process, this has mainly economical advantages. However, depending on the reaction to be performed, the cycles may also be substantially shorter or longer.

In accordance with the different energy requirements of the reactions concerned to be performed sequentially, it is further preferred in this process to set the cycling of the temperature of the fixed reactant (for example, the metal oxide) by varying the heating power, for example, because the splitting is to take place first followed by regeneration.

It is advantageous if the absorbed energy of the optical component (preferably an attenuator) is utilized for heating fluids. Such fluids may be, inter alia, reactants, auxiliary agents or heat transfer media. Being preheated, the fluids do not require that much radiated power in the reactor space any more. It is particularly preferred if the optical component is a tube bundle flowed through by the fluid.

In the process according to the invention, fossil energy, electric energy, light energy and/or nuclear energy is preferably employed.

Preferably, the required temperature can be generated by burning fossil energy carriers and/or utilizing electric energy, because usual processes utilize these energy sources.

It is also advantageous to generate the required temperature by nuclear energy because in nuclear reactions only about one third of the heat produced in the reactor can be utilized for electric power production. The (residual) heat produced can be utilized for generating the required temperature. On an industrial scale, no climate-damaging emissions of $CO_2$ are formed thereby.

Advantageously, however, the energy input takes place by light energy, especially by concentrated solar radiation, because this energy source is available at particularly low cost and is suitable for both thermal and photoreactions alike.

The generation of the required temperature by means of light energy is advantageous, because conventional energy-producing systems burning fossil energy carriers are not as resource efficient as the process according to the invention, and light energy, such as sunlight, is available worldwide.

Preferably, sunlight can be irradiated into the reaction chamber by means of optical set-ups in order to generate the required temperature. Such optical set-ups have particularly preferred manifestations, such as solar tower systems, paraboloid concentrators, sun ovens, elliptical or spherical mirrors or line-focusing concentrators. By means of solar-thermochemical water splitting, hydrogen can thus be produced on an industrial scale as a possible energy carrier of the future without climate-damaging emissions of carbon dioxide.

The required radiated power is preferably achieved by a group of heliostats, and the radiated power required for regeneration is achieved by another group of heliostats, the focus of the second group being rearranged onto the individual reaction fields. The heliostat array is separated in such a way that at least one group of heliostats covers the base load of the necessary radiated power in accordance with the reaction step with the lowest energy requirement by being "regularly" tracked in accordance with the daily course of the sun, and that at least one group of heliostats covers additional loads of necessary radiated power for reaction steps with an increased energy requirement by guiding the focus of this group to another area of the radiation receptor at defined intervals respectively after completion of the respective reaction step. By this method, two different reaction temperatures can be easily realized.

Advantageously, the reaction chambers are shifted relative to the radiation source in order to vary the heating power. A temperature change can be effected uncomplicatedly thereby while maintaining the radiated power. Thus, the reaction chambers can preferably be changeable relative to the optical set-up in order to vary the heating power. A temperature change can be effected uncomplicatedly thereby while maintaining the radiated power.

For varying the solar-thermal heating power, the use of optical components is advantageously suitable for reducing the irradiation. More particularly, optical attenuators, apertures, deflector mirrors or filters that can be shifted in space or are variable in terms of transparency are suitable for this.

This may be advantageously achieved, inter alia, by varying the focal position due to a change in the orientation of mirrors or mirror arrays, so-called heliostat arrays. This can be realized substantially more easily than the shifting of the reactor, which is mostly very heavy.

Preferably, a temperature within a range of from 500° C. to 1000° C., especially up to 900° C., is set in a first reaction chamber, and a temperature within a range of from 1000° C. to 1400° C. is set in a second reaction chamber, in order to perform, for example, the hydrogen production at a particularly low temperature in a first reaction chamber and simultaneously the regeneration at a higher temperature in a second reaction chamber. However, depending on the reaction to be performed, the temperatures employed may also deviate substantially from these values.

The fixed reactant in the two reaction chambers is advantageously selected from the group of metal hydrides, dyes, chemical compounds having redox properties, and complexing agents. Chemical compounds having redox properties within the meaning of the invention are those compounds that can be reversibly oxidized and reduced. Advantageously, these chemical compounds having redox properties are selected from the group of metal oxides, mixed metal oxides and/or doped metal oxides. Of these reactants, metal oxides have proven particularly advantageous because they are most versatile to employ and can be particularly easily fixed, for example, in contrast to metal hydrides.

More preferably, a multivalent metal oxide is employed as a fixed reactant because it can be fixed and regenerated particularly easily. "Multivalent" within the meaning of the invention means a metal oxide having several coexisting oxidation states, especially if the metal is in an oxidation state of more than +1, especially more than +2.

Preferably, the metal oxides include ferrites and/or zinc oxides and/or manganese oxides and/or cerium oxides and/or lanthanum oxides and/or other lanthanoide oxides and/or oxides of general formula $Me_x^{2+}Zn_{1-x}^{2+}Fe_2O_4$, wherein $Me_x^{2+}$ is a divalent metal ion selected from the group of Mg, Ca, Mn, Fe, Co, Ni, Cu, Zn, Sr, Sn, Ba, Cd or Pb, and/or mixtures of such oxides, or oxides with general formula $Me'_xMe''_{1-x}FeO$, wherein Me' and Me" are metal ions selected from the group of Mg, Ca, Mn, Fe, Co, Ni, Cu, Zn, Sr, Sn, Ba, Cd, Pb or lanthanoides, because these can be employed particularly efficiently in hydrogen splitting, wherein x is a number in a range of from 1 to 5, especially from 2 to 3.

Advantageously, the chemical compound having redox properties is employed as a coating of a heat-resistant support structure, more preferably a ceramic one. Due to the use of a support structure, the chemical compound having redox properties need be in the reaction chambers only in a thin layer.

Preferably, a support structure having a conical, hemispherical or paraboloid shape is employed because scattered radiation from the radiation source can be optimally utilized in the reaction chamber thereby.

In addition to the fixed reactants, mobile reactants are also employed.

In the process according to the invention, at least one of the mobile reactants is advantageously selected from the group of water, alcohols, carbon dioxide, hydrogen sulfide, nitrogen oxides, hydrocarbons, halo- or pseudohalohydrocarbons, ammonia and sulfur oxides. Of these mobile reactants, water has proven to be particularly advantageous because it is readily available and is an easily handled reactant, above all in the gas phase.

Further, at least one, more preferably all mobile reactants in the process according to the invention are advantageously gaseous. In this way, the reactant or reactants can be transferred to the reaction chambers particularly easily. In addition, preferably at least one and more preferably all mobile reaction products are gaseous, because it is equally easy then to extract them from the reaction chambers.

Therefore, the object of the invention is advantageously achieved by a process for producing hydrogen from water vapor on a surface of at least one chemical compound having redox properties, wherein:

in the first step, water vapor is split by associating oxygen to the excited chemical compound having redox properties to release hydrogen; and in the second step, the chemical compound having redox properties is regenerated at a temperature which is higher than that of the first step to release bound oxygen.

Thus, the invention can relate to a process of splitting water vapor thermally in a multi-step process by using concentrated radiation and thus producing solar hydrogen.

With the process according to the invention, water vapor can be thermally split by concentrated sunlight to produce hydrogen. This is the basis for developing the process according to the invention with which hydrogen can be produced by a solar-thermal process. In contrast to direct thermal water splitting, which takes place only at a few thousand degrees centigrade, hydrogen is produced here from water vapor in a two-step cycle process, preferably at temperatures within a range of from 800° C. to 1200° C. What is recirculated, for example, is a metal oxide system that can cleave oxygen from water molecules and reversibly bind it into its crystal structure.

Reaction 1: splitting $MeO_{red}+H_2O \rightarrow MeO_{ox}+H_2$

Reaction 2: Regeneration $MeO_{ox} \rightarrow MeO_{red}+O_2$

Preferably, metal oxides (MeO) with different doping are employed and are cyclically oxidized and reduced. In the first step, the hot water vapor flowing past the metal oxide is split by binding the oxygen to the excited metal oxide lattice at temperatures preferably within a range of from 500 to 1000° C., especially from 550 to 850° C., to release hydrogen. In the second step, the oxygen previously incorporated into the lattice is released again at temperatures preferably within a range of from 1000 to 1400° C., especially from 1050 to 1350° C., and the metal oxide is regenerated or reduced again to the high-energy state. These temperatures preferably apply to ferrites or iron mixed oxides. More preferably, the reaction temperature may advantageously be within a range of from 600° C. to 800° C., and the regeneration temperature may be within a range of from 900° C. to 1200° C. Thus, all in all, water is split into its elements by means of the metal oxide. The metal oxides employed are advantageously mixed oxides, more preferably zinc-doted ferrites.

One important innovation of the process is the advantageous combination of a ceramic support and absorber structure that can be heated at high temperatures with concentrated solar radiation, with a redox system that is capable of reversibly splitting water, for example. Preferably, porous honeycomb structures functioning as radiation absorbers are coated with ferrites. This includes advantages over comparable processes since the complete process can be performed in a single converter here. Thus, solids need not be circulated, and because the oxygen binds to the metal oxide, the product separation is reduced to one gas separation. In addition, this system enables the water splitting process to be performed at clearly lower temperatures that can be mastered in terms of material technology. Preferably, the metal oxide is recycled, so that only water is consumed. All these technical advantages also offer economical advantages over other processes for hydrogen production.

The ceramic structure coated with metal oxide advantageously forms the core of a receiver reactor. By being coupled to a concentrating solar plant (preferably a solar tower), the structure is brought to the necessary temperature by the incident concentrated solar radiation. The reactions take place on the surface of the coated ceramics. The reactor is preferably integrated in a small plant for checking and optimizing the operational behavior during water splitting or regeneration. This plant preferably comprises fittings and mass flow controllers for supplying the necessary gases, a water vapor dosing system, measuring systems for pressure and temperature, product gas treatment, and data acquisition and control. The analysis of the concentrations of produced hydrogen or released oxygen is preferably effected by a mass spectrometer.

For an efficient utilization of the reactor, it is preferably required that a continuous operation for producing the product hydrogen can take place. Since two reactions with different conditions are to be performed, a cyclic change of the reaction conditions or gases and of the required energy (temperature) must be effected.

Preferably, the water vapor is split at a temperature within a range of from 500° C. to 1000° C., especially up to 900° C., even more preferably from 550 to 850° C., and the metal oxide is regenerated at a temperature within a range of from 1000° C. to 1400° C., especially from 1050 to 1350° C. To date, it has been necessary to employ temperatures of a few thousand degrees, but at least 2000° C., for one-step thermal water splitting. The lower temperature range is more easily handled in terms of materials and process technology and significantly reduces the cost of the process.

Therefore, the object of the invention is preferably achieved by a process for the quasi-continuous production of hydrogen from water vapor on a surface of a metal oxide followed by regeneration of the surface.

For the quasi-continuous production of hydrogen from water vapor on a surface of a metal oxide followed by regeneration of the surface, it is advantageous if a quasi-continuous synthesis is performed in at least two reaction chambers, whereby water vapor can be converted to hydrogen and simultaneously another reaction chamber can be regenerated in order to convert water vapor to hydrogen again immediately afterwards. This quasi-continuous process can substantially simplify the thermal production process of hydrogen.

Thus, in the process according to the invention, advantageously the hydrogen synthesis by water splitting can take place in one reactor while the regeneration of the metal oxide takes place in another. In the subsequent cycle, the regenerated reaction chamber can then take up new reactants again. Thus, the thermal production of hydrogen can be effected continuously and simply as compared to the prior art.

In another embodiment, the object of the invention is achieved by a thermal process for the preparation of hydrogen from water vapor on a surface of a metal oxide in a gas/solid phase reaction, wherein in a reaction chamber, in a first step, water vapor is split by associating oxygen to the excited metal oxide to release hydrogen, and in a second step, the metal oxide is regenerated at a temperature which is higher than that of the first step to release bound oxygen, so that the metal oxide is available for further reactions.

Thus, the invention relates to a process for thermally splitting water vapor in a multistep process by utilizing concentrated radiation and thus to produce solar hydrogen.

In a further embodiment, the object of the invention is achieved by a photoreactor for performing the process according to the invention, characterized by having two reaction chambers.

In a still further embodiment, the object of the invention is achieved by a radiation-heated reactor for performing the process according to the invention, characterized by having two reaction chambers.

This reactor is preferably a reactor for the thermal preparation of hydrogen from water vapor on a surface in a gas/solid phase reaction comprising at least one connected tube that enables a gas stream of educt gases to flow into a reaction chamber and of product gases to flow out, and a heat source, metal oxide being provided as a reactant in one reaction chamber.

Preferably, the metal oxide is coated on a heat-resistant ceramic support structure in the reactor. This fixation has the advantage that the metal oxide is always available and thus can be exposed to the heat source optimally in the reactor. Due to the fixation of the metal oxide on the support structure, the metal oxide need not be recovered tediously by separation processes. Advantageously, the heat necessary for the reactions can also be supplied out of the support structure.

More preferably, the ceramic support structure consists of a porous honeycomb structure, because porous ceramic honeycomb structures have proven particularly heat-resistant. Pores within the meaning of this invention are the interstices formed by the honeycomb structure. This does not exclude that the material as such advantageously has itself a porosity within a range of from 10 to 60%. The porosity is obtained from the weight ratio of the actual weight to the weight when the theoretical maximum density is assumed.

Advantageously, the ceramic support structure has a conical, hemispherical or paraboloid shape in order to capture the radiation optimally onto the metal oxide. In contrast to known shapes (for example, cylindrical), peripheral radiation can also be captured more readily thereby.

The reaction chamber is advantageously provided with a transparent window because the light source can be arranged outside the actual reactor in this way.

Advantageously, tubes that attenuate the energy flow run between the reaction chamber and energy source, because this enables a better control of the reaction.

Preferably, the tubes contain a fluid because the heat exchange can be adjusted individually thereby.

The reactor is advantageously provided with a multiport valve to enable the supply of the gaseous educts.

Preferably, the multiport valve has such a design that the gaseous products can be removed separately.

Advantageously, the reactor has a modular structure consisting of at least two reaction chambers, because the quasi-continuous process described above can be implemented particularly easily thereby.

Preferably, the two reaction chambers are alternately provided with water vapor or inert gas, especially nitrogen, the switching being effected in such a way that a hydrogen production constant in time is provided.

Preferably, the metal oxides are ferrites and/or zinc oxides and/or manganese oxides and/or lanthanum oxides and/or oxides of general formula $Me_x^{2+}Zn_{1-x}^{2+}Fe_2O_4$, wherein $Me_x^{2+}$ is a divalent metal ion selected from the group of Mg, Ca, Mn, Fe, Co, Ni, Cu, Zn, Sr, Sn, Ba, Cd, Pb or lanthanoides, and/or mixtures of such oxides, because these can be employed particularly efficiently in water splitting, wherein x is a number within a range of from 1 to 5, especially from 2 to 3.

Advantageously, a concentrating solar-thermal system, such as a solar tower system, a paraboloid concentrator, a sun oven, an elliptical or spherical mirror or a line-focusing concentrator, is employed as the energy source.

Preferably, the required radiated power is achieved by a group of heliostats, and the radiated power required for regeneration is achieved by another group of heliostats, the focus of the second group being rearranged onto the individual reaction fields.

Figure 2:
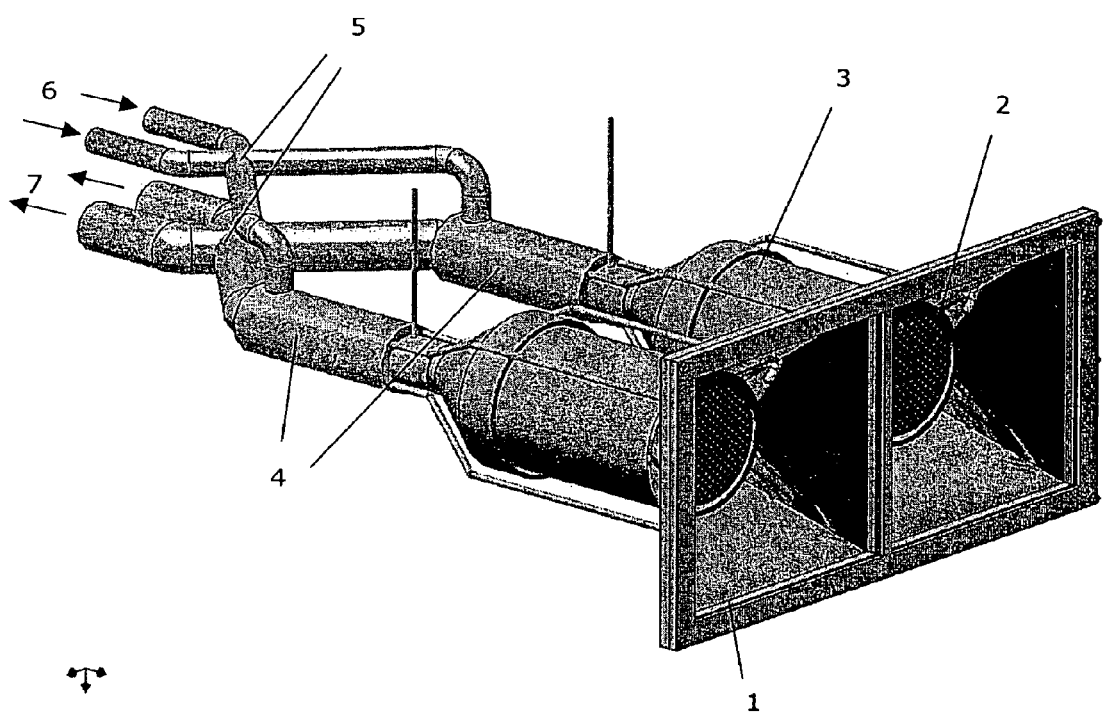
Figure 3:
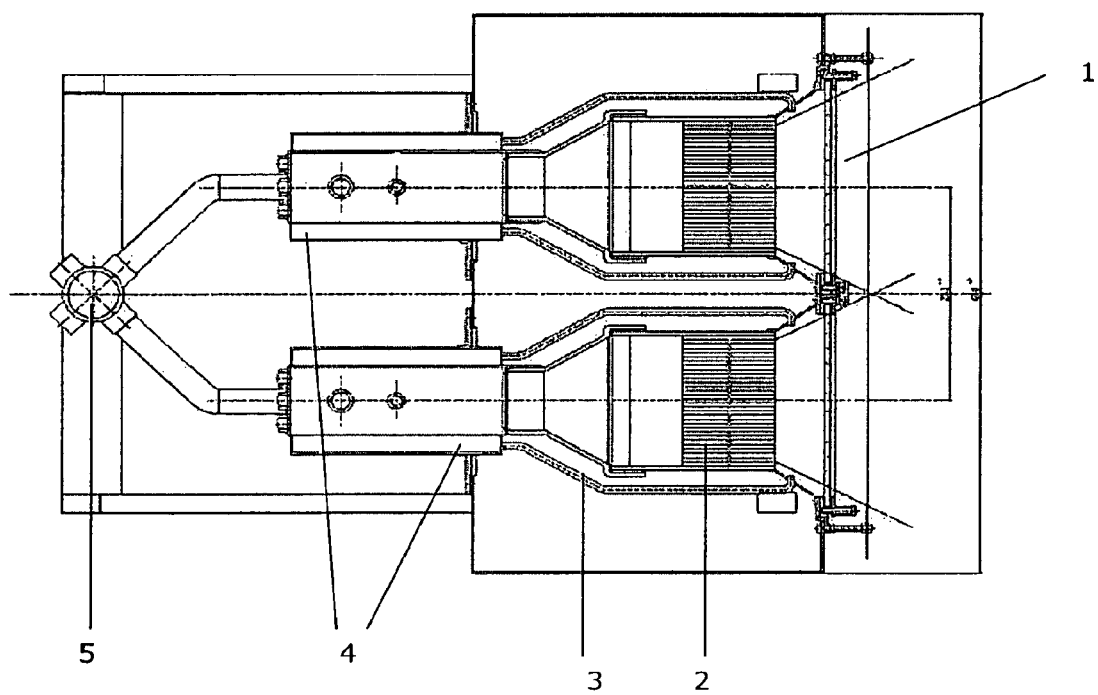

FIG. 2 shows the receiver reactor, the concentrated solar radiation being incident from the right-hand side onto the aperture with quartz windows (1). The power of the incident light can be adjusted by an aperture. The receiver reactor is based on the connection as described above of the metal oxide redox system with a support and absorber structure which consists of a ceramic monolith having a honeycomb structure (2). The monolith is coated with the metal oxide and built into a cylindrical housing (3). In a directly absorbing receiver, the honeycomb structure enables high temperatures to be generated with low back radiation losses. The reactor consists of a modular two-component system of permanently installed honeycomb-like absorbers. Two neighboring, but separated reaction chambers form a minimum arrangement of modules for the continuous production of hydrogen. The square aperture (1) allows the formation of large and flexible receiver areas by serial connection of individual modules. A double tube is provided for preheating the supplied gases nitrogen and water vapor by recovering the heat from the product gas (4).

Figure 4:
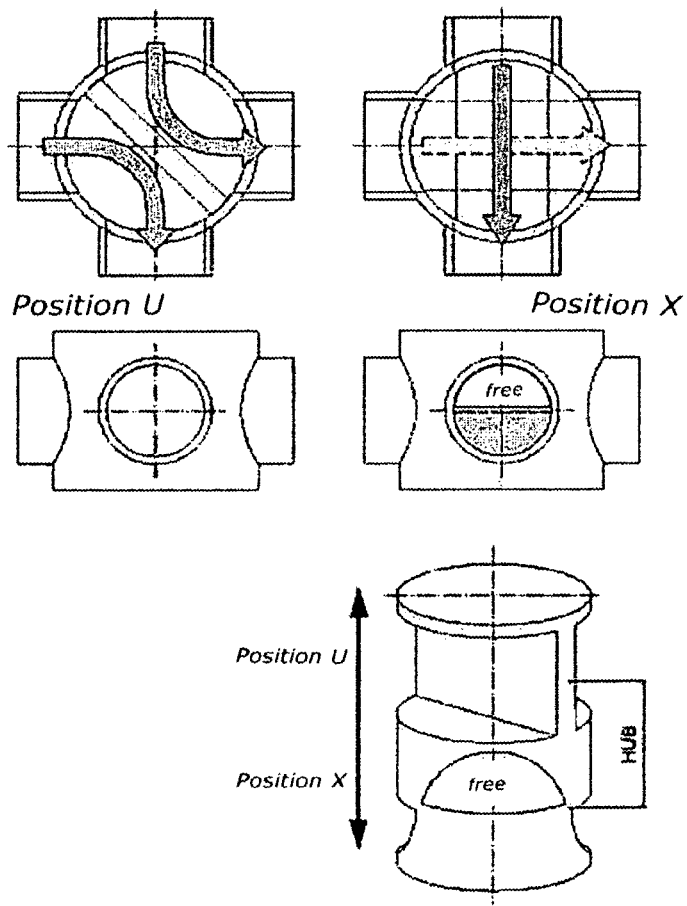

The operation of the Konti reactor is based on the simultaneous use of the two modules. While water is split in one of the reaction chambers, regeneration takes place in the other. After the reactions are completed, the regenerated module is switched for splitting and vice versa by swapping the gas supply. A precondition of this continuous operation and the hydrogen production is the separate supply of nitrogen gas, which is employed as a carrier gas or scavenging gas, and water vapor (6). In addition, separate lines for the products of the splitting on the one hand and for the oxygen-containing scavenging gas for the regeneration on the other hand are necessary (7). This is enabled by four-way valves (5 and 5a), which are respectively switched over after a reaction step is completed. One of these valves (5) must withstand high temperatures of up to 600° C. FIG. 4 shows the positions of this valve.

The two steps of the process are performed in the same reactor at different temperature levels with a different heat demand. The regeneration is endothermal and advantageously proceeds within a temperature range of from 1100 to 1200° C. The splitting of the water vapor is slightly exothermal and takes place at 800° C. Therefore, part of the modules (regeneration) requires a higher solar flux density (intensity) as compared to the second part, i.e., that for the splitting of water, which demands only a little energy for the compensation of heat losses. Thus, cycling of the irradiation intensity is required when the cycle is switched over from regeneration to splitting or vice versa. For this purpose, a change of mirror focusing between two equal foci by suitably adjusting the concentrating mirrors of the solar plant is provided. The periodic change of the irradiation intensity is achieved by optical components that can be changed in time, for example, optical lattices as attenuators, deflector mirrors or semitransparent mirrors. Such a component is moveable and is positioned in front of one of the two apertures. When the supplied gas is changed, the position of the component can be switched over accordingly. It is also possible, though with higher technical expenditure, to change the receiver position in time between locations with different irradiation intensities.

The invention claimed is:

1. A process for the quasi-continuous thermal production of hydrogen from water vapor by associating oxygen to a reaction partner to release hydrogen and regenerating the reaction partner at a higher temperature to release bound oxygen, characterized in that:

said release of hydrogen reaction and regeneration of the reaction partner at a higher temperature to release bound oxygen reaction are performed in sequential reversible steps in at least two radiation-heated reaction chambers in parallel, wherein the reactions in each chamber are out of phase with each other, in each of which at least one reactant selected from the group comprising ferrites and/or zinc oxides and/or manganese oxides and/or lanthanum oxides and/or lanthanide oxides and/or oxides of general formula $M_x^{2+}Zn_{1-x}^{2+}Fe_2O_4$, wherein M is a divalent metal ion selected from the group of Mg, Ca, Mn, Fe, Co, Ni, Cu, Zn, Sr, Sn, Ba, Cd or Pb, wherein x is a number within a range of from 1 to 5;

and mixtures of such oxides is locally fixed and provided as a coating on a locally fixed ceramic monolithic support structure, wherein sunlight is supplied to the reaction chambers by means of optical systems, and cyclically alternating reaction conditions in the reaction chambers are provided by a cyclic change of the temperatures of the reaction chambers by changing the reaction chambers relative to the radiation source, wherein a temperature within a range of from 500° C. to 900° C. is set in a first reaction chamber, and a temperature within a range of from 1000° C. to 1400° C. is set in a second reaction chamber.

2. The process according to claim 1, characterized in that radiation-heated reactors are employed as reaction chambers.

3. The process according to claim 1, characterized in that said cyclically alternating reaction conditions are provided by cycling the temperature of the reaction chambers by varying the heating power.

4. The process according to claim 1, characterized in that fossil energy, electric energy, light energy and/or nuclear energy is employed as the radiation source.

5. The process according to claim 1, characterized in that a support structure used to support said at least one reactant, has a conical, hemispherical, cylindrical or paraboloid shape.

6. The process according to claim 1, wherein:
   in the first step, water vapor is thermally split by associating oxygen to said at least one reactant to release hydrogen; and
   in the second step, said at least one reactant is regenerated at a temperature which is higher than that of the first step to release bound oxygen.

7. The process according to claim 1, wherein said chemical reaction is a quasi-continuous production of hydrogen from water vapor on a surface of said at least one reactant that is a metal oxide followed by regeneration of the surface.

* * * * *